US011003561B2

(12) United States Patent
Ayyagari et al.

(10) Patent No.: US 11,003,561 B2
(45) Date of Patent: May 11, 2021

(54) SYSTEMS AND METHODS FOR PREDICTING INFORMATION HANDLING RESOURCE FAILURES USING DEEP RECURRENT NEURAL NETWORKS

(71) Applicant: Dell Products L.P., Round Rock, TX (US)

(72) Inventors: Sai Prem Kumar Ayyagari, Nellore (IN); Landon Martin Chambers, Austin, TX (US); Mohanraj Ramalingam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 551 days.

(21) Appl. No.: 15/861,039

(22) Filed: Jan. 3, 2018

(65) Prior Publication Data

US 2019/0205232 A1 Jul. 4, 2019

(51) Int. Cl.
*G06F 11/22* (2006.01)
*G06F 11/07* (2006.01)

(52) U.S. Cl.
CPC ........ *G06F 11/2257* (2013.01); *G06F 11/079* (2013.01); *G06F 11/0775* (2013.01); *G06F 11/0793* (2013.01); *G06F 11/2205* (2013.01)

(58) Field of Classification Search
CPC ............. G06F 11/2257; G06F 11/0775; G06F 11/079; G06F 11/0793; G06F 11/2205
See application file for complete search history.

(56) References Cited

U.S. PATENT DOCUMENTS

| | | | | |
|---|---|---|---|---|
| 6,442,542 | B1* | 8/2002 | Ramani | G01R 31/2846 706/47 |
| 2007/0260566 | A1* | 11/2007 | Urmanov | G06K 9/6287 706/25 |
| 2010/0332189 | A1* | 12/2010 | Urmanov | G06F 11/3058 702/186 |
| 2016/0034809 | A1* | 2/2016 | Trenholm | G06F 8/35 706/20 |
| 2016/0350194 | A1* | 12/2016 | Mohan | G06N 3/088 |
| 2017/0262758 | A1* | 9/2017 | Boyapalle | G06F 21/00 |
| 2018/0336494 | A1* | 11/2018 | Wagstaff | G06N 5/04 |
| 2019/0155712 | A1* | 5/2019 | Tiwari | G06N 5/00 |

OTHER PUBLICATIONS

Colah, "Understanding LSTM Networks", http://colah.github.io/, Aug. 27, 2015, pp. 1-16 (Year: 2015).*
Narayanan, Iyswarya et al, "SSD Failures in Datacenters: What? When? and Why?", ACM SYSTOR 2016, Jun. 6, 2016, pp. 1-11 (Year: 2016).*

* cited by examiner

*Primary Examiner* — Matthew M Kim
*Assistant Examiner* — Indranil Chowdhury
(74) *Attorney, Agent, or Firm* — Jackson Walker L.L.P.

(57) ABSTRACT

In accordance with embodiments of the present disclosure, an information handling system may include a processor and a non-transitory computer-readable medium having stored thereon a program of instructions executable by the processor. The program of instructions may be configured to, when read and executed by the processor, receive telemetry data associated with one or more information handling resources, receive failure statistics associated with the one or more information handling resources, and correlate the telemetry data and the failure statistics to create training data for a pattern recognition engine configured to predict a failure status of an information handling resource from operational data associated with the information handling resource.

15 Claims, 2 Drawing Sheets

SYSTEMS AND METHODS FOR PREDICTING INFORMATION HANDLING RESOURCE FAILURES USING DEEP RECURRENT NEURAL NETWORKS

TECHNICAL FIELD

The present disclosure relates in general to information handling systems, and more particularly to methods and systems for predicting information handling resource failures using deep recurrent neural networks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling resources, in particular hard disk drives and batteries, may suffer from faults or failures that require replacement. However, replacement of such devices after failure or fault may be undesirable as it leads to system downtown. Accordingly, systems and methods for predicting component failure in order to enable pre-failure replacement of information handling systems is desired.

SUMMARY

In accordance with the teachings of the present disclosure, the disadvantages and problems associated with addressing failures of information handling resources in an information handling system may be reduced or eliminated.

In accordance with embodiments of the present disclosure, an information handling system may include a processor and a non-transitory computer-readable medium having stored thereon a program of instructions executable by the processor. The program of instructions may be configured to, when read and executed by the processor, receive telemetry data associated with one or more information handling resources, receive failure statistics associated with the one or more information handling resources, and correlate the telemetry data and the failure statistics to create training data for a pattern recognition engine configured to predict a failure status of an information handling resource from operational data associated with the information handling resource.

In accordance with these and other embodiments of the present disclosure, a method may include receiving telemetry data associated with one or more information handling resources, receiving failure statistics associated with the one or more information handling resources, and correlating the telemetry data and the failure statistics to create training data for a pattern recognition engine configured to predict a failure status of an information handling resource from operational data associated with the information handling resource.

In accordance with these and other embodiments of the present disclosure, an article of manufacture may include a non-transitory computer-readable medium and computer-executable instructions carried on the computer readable medium. The instructions may be readable by a processor, and the instructions, when read and executed, may cause the processor to receive telemetry data associated with one or more information handling resources, receive failure statistics associated with the one or more information handling resources, and correlate the telemetry data and the failure statistics to create training data for a pattern recognition engine configured to predict a failure status of an information handling resource from operational data associated with the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
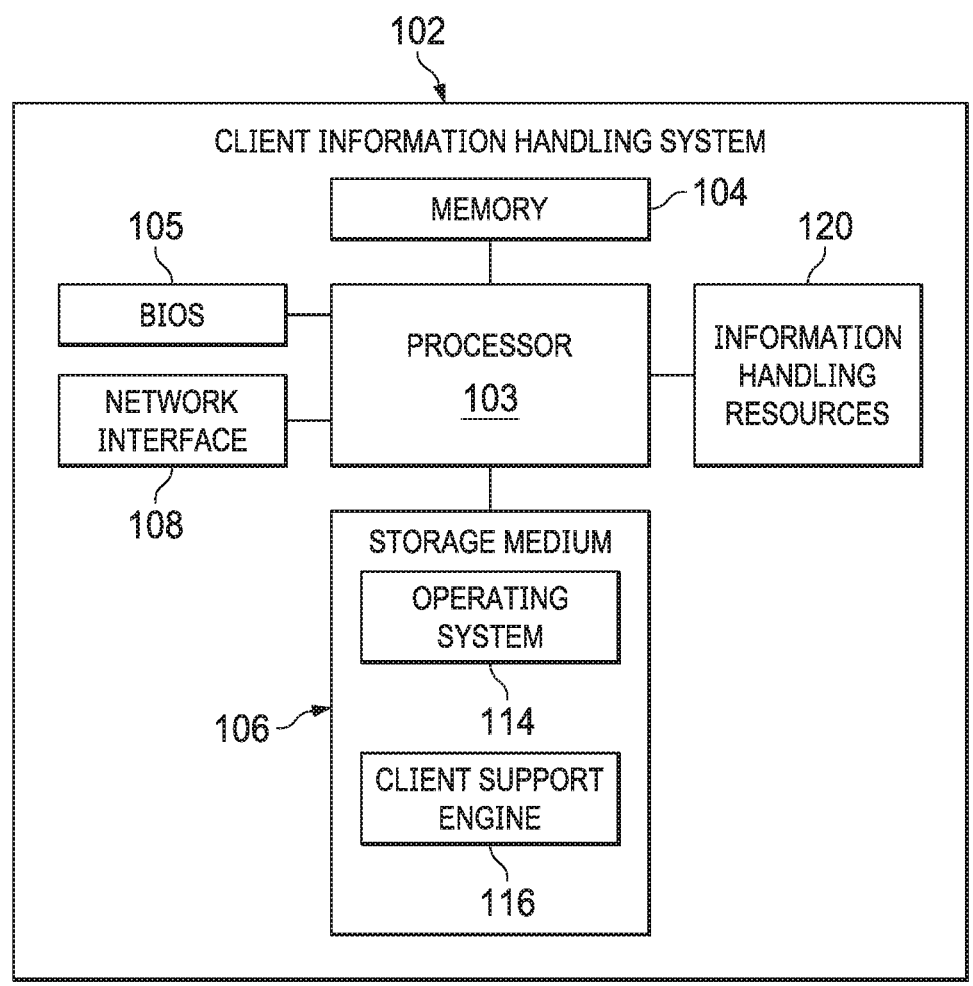
FIG. 1 illustrates a block diagram of an example client information handling system, in accordance with embodiments of the present disclosure.
Figure 2:
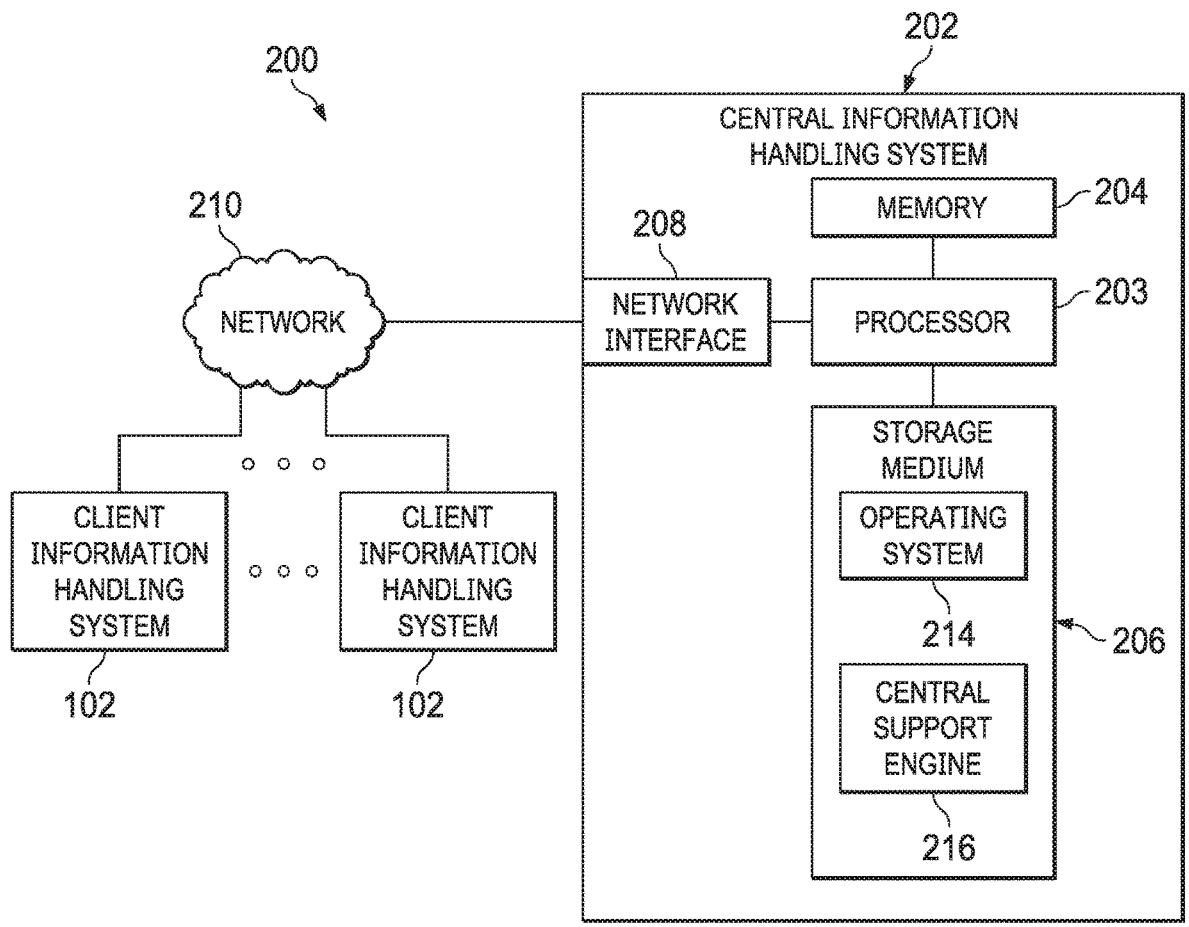
FIG. 2 illustrates a block diagram of an example system for predicting information handling resource failures, in accordance with embodiments of the present disclosure.
Figure 3:
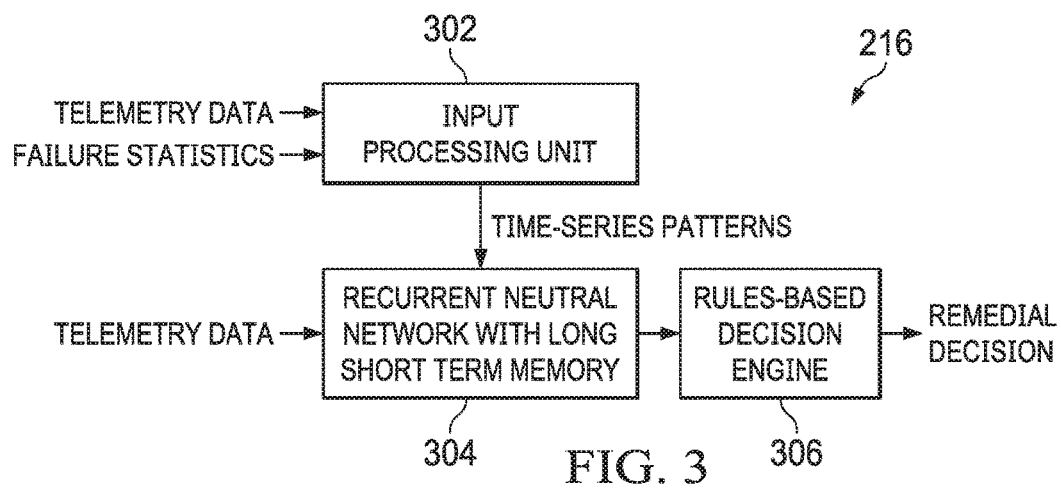
FIG. 3 illustrates a functional block diagram of the central support engine depicted in FIG. 2, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example client information handling system 102, in accordance with embodiments of the present disclosure. In some embodiments, client information handling system 102 may comprise a server. In other embodiments, client information handling system 102 may be a personal computer (e.g., a desktop computer, a laptop, notebook, tablet, handheld, smart phone, personal digital assistant, etc.). As depicted in FIG. 1, client information handling system 102 may include a processor 103, a memory 104 communicatively coupled to processor 103, a storage medium 106 communicatively coupled to processor 103, a basic input/output system (BIOS) 105 communicatively coupled to processor 103, a network interface 108 communicatively coupled to processor 103, and one or more other information handling resources 120 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage medium 106, BIOS 105, and/or another component of client information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to client information handling system 102 is turned off.

Storage medium 106 may be communicatively coupled to processor 103 and may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114, and a client support engine 116.

OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

Client support engine 116 may comprise a program of instructions configured to, when loaded into memory 104 and executed by processor 103, perform one or more tasks related to collection and communication (e.g., via network interface 108) of telemetry information associated with information handling resources of information handling system 102 (including, without limitation, storage medium 106 and information handling resources 120), as is described in greater detail elsewhere in this disclosure.

BIOS 105 may be communicatively coupled to processor 103 and may include any system, device, or apparatus configured to identify, test, and/or initialize information handling resources of client information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when client information handling system 102 is booted and/or powered on. As part of its initialization functionality, code for BIOS 105 may be configured to set components of client information handling system 102 into a known state, so that one or more applications (e.g., operating system 114 or other application programs) stored on compatible media (e.g., memory 104, storage medium 106) may be executed by processor 103 and given control of client information handling system 102.

Network interface 108 may include any suitable system, apparatus, or device operable to serve as an interface between client information handling system 102 and a network external to client information handling system 102 (e.g., network 210 depicted in FIG. 2). Network interface 108 may allow client information handling system 102 to communicate via an external network using any suitable transmission protocol and/or standard.

Generally speaking, information handling resources 120 may include any component system, device or apparatus of information handling system 102, including without limitation processors, buses, computer-readable media, input-output devices and/or interfaces, storage resources, network interfaces, motherboards, electro-mechanical devices (e.g., fans), displays, batteries, and/or power supplies.

FIG. 2 illustrates a block diagram of an example system 200 for predicting information handling resource failures, in accordance with embodiments of the present disclosure. As shown in FIG. 2, system 200 may include a plurality of client information handling systems 102 (such as those depicted in FIG. 1), a central information handling system 202, and a network 210 communicatively coupled to client information handling systems 102 and central information handling system 202.

In some embodiments, central information handling system 202 may comprise a server. In other embodiments, central information handling system 202 may be a personal computer (e.g., a desktop computer, a laptop, notebook, tablet, handheld, smart phone, personal digital assistant, etc.). As depicted in FIG. 2, central information handling system 202 may include a processor 203, a memory 204 communicatively coupled to processor 203, a storage medium 206 communicatively coupled to processor 203, and a network interface 208 communicatively coupled to processor 203.

Processor 203 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204, storage medium 206, and/or another component of client information handling system 202.

Memory 204 may be communicatively coupled to processor 203 and may include any system, device, or apparatus configured to retain program instructions and/or data for a period of time (e.g., computer-readable media). Memory 204 may include RAM, EEPROM, a PCMCIA card, flash memory, magnetic storage, opto-magnetic storage, or any suitable selection and/or array of volatile or non-volatile memory that retains data after power to client information handling system 202 is turned off.

Storage medium 206 may be communicatively coupled to processor 203 and may include any system, device, or apparatus operable to store information processed by processor 203. Storage medium 206 may include, for example, network attached storage, one or more direct access storage devices (e.g., hard disk drives), and/or one or more sequential access storage devices (e.g., tape drives). As shown in FIG. 2, storage medium 206 may have stored thereon an operating system (OS) 214, and a central support engine 216.

OS 214 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 214. Active portions of OS 214 may be transferred to memory 204 for execution by processor 203.

Central support engine 216 may comprise a program of instructions configured to, when loaded into memory 204 and executed by processor 203, perform one or more tasks related to receipt of telemetry information from client information handling systems 102, receipt of data regarding actual failure of information handling resources, and correlate such telemetry information and failure information to predict the occurrence of failures of information handling resources of client information handling systems 102, as is described in greater detail elsewhere in this disclosure.

Network interface 208 may include any suitable system, apparatus, or device operable to serve as an interface between central information handling system 202 and network 210. Network interface 208 may allow central information handling system 202 to communicate via an external network using any suitable transmission protocol and/or standard.

In addition to or in lieu of one or more of processor 203, memory 204, storage medium 206, and network interface 208, central information handling system 202 may comprise one or more other information handling resources.

Network 210 may comprise a network and/or fabric configured to couple information handling systems of system 200 (e.g., client information handling systems 102 and central information handling system 202) to one another. Thus, central information handling system 202 may be able to access, via network 210, telemetry data collected and communicated by client support engines 116 executing on client information handling systems 102.

FIG. 3 illustrates a functional block diagram of central support engine 216 depicted in FIG. 2, in accordance with embodiments of the present disclosure. As shown in FIG. 3, central support engine 216 may implement an input processing unit 302, a recurrent neural network with long short term memory (RNN/LSTM) 304, and a rule-based decision engine 306.

Input processing unit 302 may receive telemetry data from client information handling systems 102 and may also receive failure statistics regarding client information handling systems 102. Such telemetry data may include any operational data associated with an information handling resource of a client information handling system 102. For example, telemetry data may include information regarding performance of an information handling resource, environmental conditions associated with an information handling resource, or any other suitable operational data regarding an information handling resource. As a specific example, telemetry data for a hard disk drive may include information regarding cyclic redundancy check errors, volume of read input/output, volume of write input/output, operating temperature, rotation rate of rotational media, number of power cycles, amount of time the hard disk drive is powered on, and/or other parameters. Failure statistics may include, for each information handling resource from which telemetry data is received, an indication of a failure status of the information handling resource (e.g., failed, about to fail, healthy). In some embodiments, failure statistics may be received from a repair and/or servicing facility that may manually or automatically inspect information handling resources for their health status.

From the telemetry data and the failure statistics, the input processing unit 302 may create one or more labeled time series patterns, which it may output to RNN/LSTM 304 as training data. Input processing unit 302 may generate the time series patterns to have any suitable length and may sample telemetry data and failure statistics at any appropriate sampling frequency. Input processing unit 302 may handle any uneven time gaps in sample or the time series by transforming such gaps into the frequency domain by means of a fast Fourier transform or discrete cosine transform. As is known in the art, fast Fourier transform and discrete cosine transform are two different frequency-domain techniques to convert a time series signal into frequency domain. Fast Fourier transform may have drawbacks when applied to compressed signals and discrete cosine transform may be used with respect to compressed signals.

RNN/LSTM 304 may receive the time series data as training data, such that RNN/LSTM 304 may perform as a pattern recognition engine. Thus, in operation, once trained, RNN/LSTM 304 may monitor telemetry data from information handling resources of client information handling systems 102 and predict a failure status (e.g., failed, about to fail, healthy) based on pattern analysis of the telemetry data. Accordingly, RNN/LSTM 304 may predict a failure of an information handling resource before it actually occurs.

Based on the failure status, rules-based decision engine 306 may generate a decision for one or more information handling resources based on the predicted failure status. Rules applied by rules-based decision engine 306 may consider warranty status of an information handling resource, criticality of the information handling resource, service/support level of the information handling resource, and/or any other suitable factor. For information handling resources predicted to have a status of failed or about to fail, the decision generated by rules-based decision engine 306 may comprise any remedial action to be taken in response to the status, including dispatch of a replacement information handling resource, dispatch of a technician to repair or replace the information handling resource, and/or communication of an alert regarding the information handling resource.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a non-transitory computer-readable medium having stored thereon a program of instructions executable by the processor, the program of instructions configured to, when read and executed by the processor:
   receive telemetry data associated with one or more information handling resources, wherein the one or more information handling resources includes a hard disk drive, and wherein the telemetry data includes information regarding cyclic redundancy check (CRC) errors for the hard disk drive, volume of read input/output (I/O) for the hard disk drive, volume of write I/O for the hard disk drive, operating temperature for the hard disk drive, rotation rate of rotational media of the hard disk drive, number of power cycles for the hard disk drive, and an amount of time the hard disk drive has been powered on;
   receive failure statistics associated with the one or more information handling resources, wherein the failure statistics include an indication of whether each of the one or more information handling resource is failed, about to fail, or healthy; and
   correlate the telemetry data and the failure statistics to create training data for a pattern recognition engine configured to predict a failure status of an information handling resource from operational data associated with the information handling resource.

2. The information handling system of claim 1, wherein the training data comprises time series data generated from the telemetry data and the failure statistics.

3. The information handling system of claim 1, wherein the program of instructions is further configured to, when read and executed by the processor, implement the pattern recognition engine as a recurrent neural network with long short term memory.

4. The information handling system of claim 1, wherein the program of instructions is further configured to, when read and executed by the processor, handle non-uniform time gaps in the telemetry data and the failure statistics by transforming such gaps into the frequency domain by way of a fast Fourier transform or discrete cosine transform.

5. The information handling system of claim 1, wherein the program of instructions is further configured to, when read and executed by the processor, apply a rules-based decision engine to the failure status to determine a remedial action for the information handling resource.

6. A method comprising:
   an information handling system receiving telemetry data associated with one or more information handling resources, wherein the one or more information handling resources includes a hard disk drive, and wherein the telemetry data includes information regarding cyclic redundancy check (CRC) errors for the hard disk drive, volume of read input/output (I/O) for the hard disk drive, volume of write I/O for the hard disk drive, operating temperature for the hard disk drive, rotation rate of rotational media of the hard disk drive, number of power cycles for the hard disk drive, and an amount of time the hard disk drive has been powered on;
   the information handling system receiving failure statistics associated with the one or more information handling resources, wherein the failure statistics include an indication of whether each of the one or more information handling resource is failed, about to fail, or healthy; and
   the information handling system correlating the telemetry data and the failure statistics to create training data for a pattern recognition engine configured to predict a failure status of an information handling resource from operational data associated with the information handling resource.

7. The method of claim 6, wherein the training data comprises time series data generated from the telemetry data and the failure statistics.

8. The method of claim 6, further comprising the information handling system implementing the pattern recognition engine as a recurrent neural network with long short term memory.

9. The method of claim 6, further comprising the information handling system handling non-uniform time gaps in the telemetry data and the failure statistics by transforming such gaps into the frequency domain by way of a fast Fourier transform or discrete cosine transform.

10. The method of claim 6, further comprising the information handling system applying a rules-based decision engine to the failure status to determine a remedial action for the information handling resource.

11. An article of manufacture comprising:
a non-transitory computer-readable medium; and
computer-executable instructions carried on the computer readable medium, the instructions readable by a processor, the instructions, when read and executed, for causing the processor to:
receive telemetry data associated with one or more information handling resources, wherein the one or more information handling resources includes a hard disk drive, and wherein the telemetry data includes information regarding cyclic redundancy check (CRC) errors for the hard disk drive, volume of read input/output (I/O) for the hard disk drive, volume of write I/O for the hard disk drive, operating temperature for the hard disk drive, rotation rate of rotational media of the hard disk drive, number of power cycles for the hard disk drive, and an amount of time the hard disk drive has been powered on;
receive failure statistics associated with the one or more information handling resources, wherein the failure statistics include an indication of whether each of the one or more information handling resource is failed, about to fail, or healthy; and
correlate the telemetry data and the failure statistics to create training data for a pattern recognition engine configured to predict a failure status of an information handling resource from operational data associated with the information handling resource.

12. The article of claim 11, wherein the training data comprises time series data generated from the telemetry data and the failure statistics.

13. The article of claim 11, the instructions for further causing the processor to, when read and executed by the processor, implement the pattern recognition engine as a recurrent neural network with long short term memory.

14. The article of claim 11, the instructions for further causing the processor to, when read and executed by the processor, handle non-uniform time gaps in the telemetry data and the failure statistics by transforming such gaps into the frequency domain by way of a fast Fourier transform or discrete cosine transform.

15. The article of claim 11, the instructions for further causing the processor to, when read and executed by the processor, apply a rules-based decision engine to the failure status to determine a remedial action for the information handling resource.

* * * * *